(12) United States Patent
Gunnarsson et al.

(10) Patent No.: US 8,639,251 B2
(45) Date of Patent: Jan. 28, 2014

(54) METHODS OF AND APPARATUSES FOR CELL-DIFFERENTIATED HANDOVER IN A MOBILE COMMUNICATIONS SYSTEMS

(75) Inventors: Fredrik Gunnarsson, Linköping (SE); Bo Hagerman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1328 days.

(21) Appl. No.: 10/594,122

(22) PCT Filed: Mar. 30, 2004

(86) PCT No.: PCT/SE2004/000490
§ 371 (c)(1),
(2), (4) Date: Sep. 25, 2006

(87) PCT Pub. No.: WO2005/096657
PCT Pub. Date: Oct. 13, 2005

(65) Prior Publication Data
US 2007/0191013 A1    Aug. 16, 2007

(51) Int. Cl.
*H04W 36/00* (2009.01)
(52) U.S. Cl.
USPC .......... 455/437; 455/436; 455/440; 455/441; 455/442
(58) Field of Classification Search
USPC .................. 455/436, 442–444, 437, 438
See application file for complete search history.

(56) References Cited

U.S. PATENT DOCUMENTS

| 4,670,899 | A | * | 6/1987 | Brody et al. | 455/453 |
|---|---|---|---|---|---|
| 5,428,816 | A | * | 6/1995 | Barnett et al. | 455/437 |
| 5,499,386 | A | | 3/1996 | Karlsson | |
| 6,044,249 | A | | 3/2000 | Chandra et al. | |
| 6,584,318 | B2 | | 6/2003 | Hakalin et al. | |
| 7,031,710 | B2 | * | 4/2006 | Pedraza et al. | 455/436 |
| 2005/0026619 | A1 | * | 2/2005 | Jha | 455/441 |

FOREIGN PATENT DOCUMENTS

| WO | 02/47423 A2 | 6/2002 |
|---|---|---|
| WO | WO 02096146 | 11/2002 |

OTHER PUBLICATIONS

International Search Report of PCT/SE2004/000490, mailed Nov. 12, 2004.
Wang et al, "Adaptive soft handoff method using mobile location information" In: IEEE 55th Vehicular Technology Conference, VIC Spring 2002. Birmingham, AL, USA, May 6-9, 2002, vol. 4, pp. 1936-1940.
3GPP TS 25.331 V6.0.0; 3rd Generation Partnership Project; Technical Specification Group Radio Access Network; Radio Resource Control (RRC); protocol specification; Dec. 2003.

(Continued)

*Primary Examiner* — Kathy Wang-Hurst
(74) *Attorney, Agent, or Firm* — Nixon & Vanderhye, P.C.

(57) ABSTRACT

The present invention relates to handover procedures in a cellular communications system (1). The cells (10-70) of the system (1) are divided into multiple handover-related classes based on their respective radio coverage characteristics. Each such cell class is then associated with a unique handover parameter or a unique set of parameters that are used in handover procedures involving the cells (10-70). The parameter values are adapted for the radio coverage characteristics of each cell class in order to generate a suitable handover region size of the cells (10-70). The handover parameters are used together with user equipment-assisted signal quality measurements for triggering the handover procedures.

25 Claims, 10 Drawing Sheets

(56) References Cited

OTHER PUBLICATIONS

3GPP TS 25.922 V5.2.0; $3^{rd}$ Generation Partnership Project; Technical Specification Group Radio Access Network; Radio resource management strategies; Dec. 2003.

3GPP TS 25.133 V6.4.0; $3^{rd}$ Generation Partnership Project; Technical Specification Group Radio Access Network; Requirements for support of radio resource management; Dec. 2003.

* cited by examiner

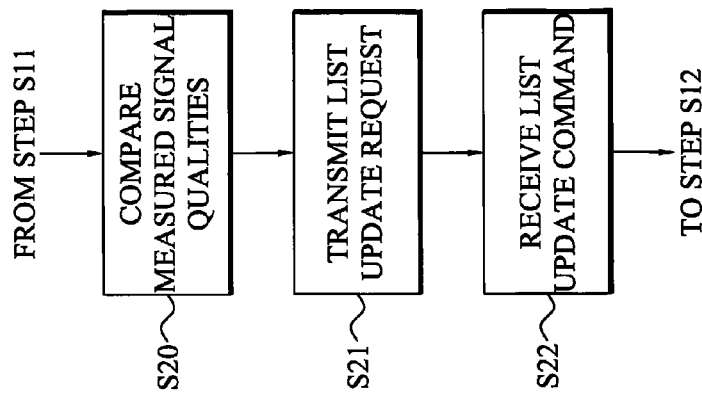
Fig. 13
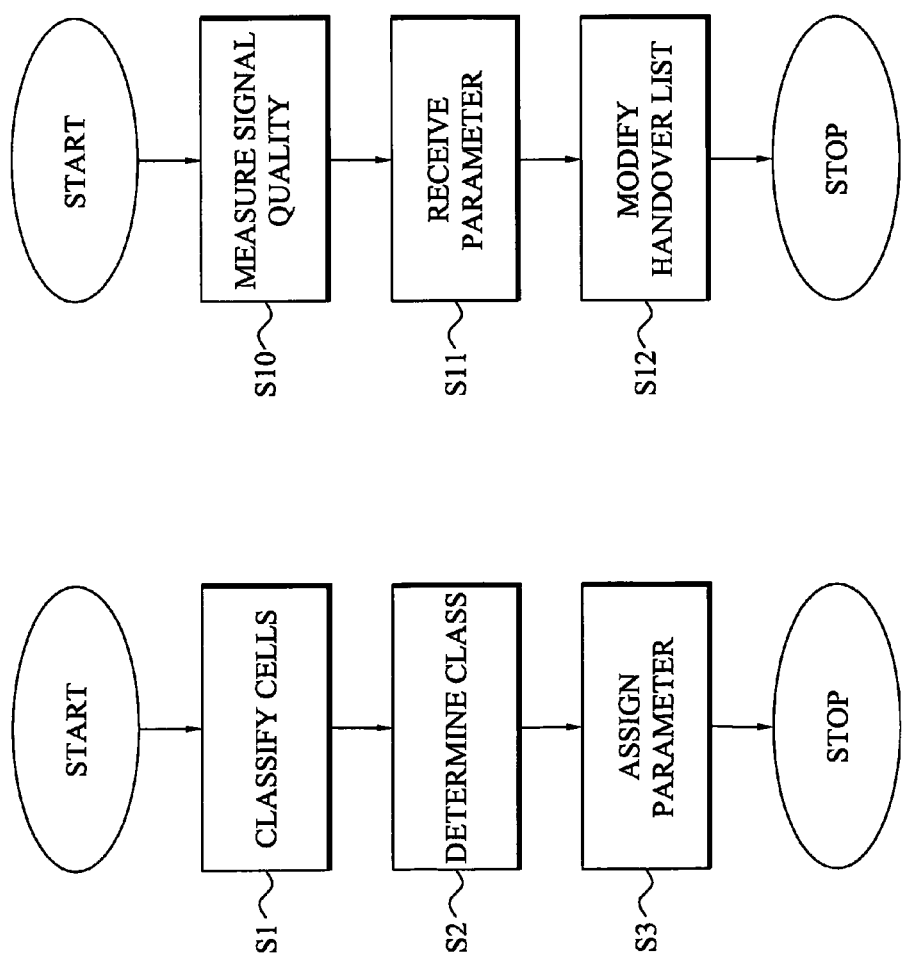
Fig. 12
Fig. 11

METHODS OF AND APPARATUSES FOR CELL-DIFFERENTIATED HANDOVER IN A MOBILE COMMUNICATIONS SYSTEMS

This application is the US national phase of international application PCT/SE2004/000490, filed 30 Mar. 2004, which designated the U.S., the entire content of which is hereby incorporated by reference.

TECHNICAL FIELD

The disclosed technology generally relates to handover procedures in cellular communications systems, and in particular to cell-differentiated handover procedures in such systems.

BACKGROUND

In a cellular radio communications system, mobile user equipment is generally free to move within the system and connect from one base station to another as it progresses between different serving cells. This cell crossover is generally denoted handover in the art.

In a Code Division Multiple Access (CDMA) communications system, a soft handover is offered to mobile user equipment, in which the mobile equipment at least temporarily is simultaneously connected to multiple cells in order to allow a smooth and seamless transition between cells. Thus, in this category of handover procedures, radio links are added and abandoned in such a manner that the user equipment always keeps at least one radio link to a (serving) cell in the system.

The handover function in a CDMA system is supported by user equipment-assisted signal quality measurements of a broadcast or beacon channel, e.g. Common Pilot Channel (CPICH), of its serving cell and any neighboring cells. The typical configuration is to setup such event-triggered quality measurements with measurement control messages from a serving Radio Network Controller (RNC) in the CDMA system. Such measurements could include the Received Signal Code Power (RSCP) of the CPICHs, ratio of energy level per received chip/bit to the noise spectral density (Ec/No, Eb/No) and/or path loss from the base station of respective cells, which is discussed in more detail in the 3GPP document [1]. In addition to information for which scrambling codes, i.e. the monitored neighboring cells, to report the signal quality measurements, the control messages from the RNC to the user equipment comprise a handover triggering threshold or margin. A handover procedure is then triggered based on a comparison of the measured signal qualities and the handover threshold.

This handover threshold is determined by the communication system and is communicated to the user equipment. The threshold determines the resulting size of a handover region between two cells. Conventionally, equal handover thresholds for all kinds of handover are employed through the system. The handover threshold will then be a compromise between two conflicting goals. Firstly, a large handover region is desired so that the user equipment travelling from one cell to another has time to measure, report, configure and synchronize on the new cell before the link to the old serving cell has to be dropped due to insufficient signal quality. Secondly, a relative small handover region is desired from a (downlink) radio resource point of view. Thus, a too large handover region will result in that the user equipment simultaneously is connected to multiple (downlink) radio channels during a rather long period of time. This means that the user equipment will, unnecessarily, occupy radio resources that could have been better used for other applications. Thus, the handover threshold has to be carefully chosen based on these conflicting goals and in some instances a fixed handover threshold for all kinds of handover procedures will result in reduced service of quality and possibly dropped calls for the user equipment.

In a US Patent [2], Hakalin and Hulkkonen disclose a method of dividing traffic between cells managed by a respective base station in a cellular radio system. The base station of a serving cell receives, from its connected mobile stations, power measurements of broadcast control channels from neighboring cells. The number of common available frequencies of the cell and the reported neighboring cells is calculated. Cells having at least one common frequency with the serving cell are tabulated in a table indicating, for each neighboring cell: its identifier, the ratio of the common frequencies of the serving cell and the neighboring cell and a ratio between the number of reported poor power quality measurements relative to all reported power measurements. The poor quality percentage in this table is then used for determining a connection ratio for each interfered neighboring cell. This connection ratio is, in turn, used for determining a correction factor that is used for dynamically modulating the handover threshold for the serving cell and its neighboring cells. Thus, a handover threshold that is based on the amount of traffic and interference in the system is obtained.

In a US Patent [3], Chandra et al disclose a method that generally determines optimal handover thresholds based on a computation of a power budget for each serving cell/neighbor cell combination in a cellular communications system and on a probability distribution function for each such cell combination. The determination of handover threshold will be a compromise between call quality and an evenly distributed traffic channel density among the cells in the system. The optimization is formulated as a nonlinear optimization of two objective functions subjected to nonlinear constraints that characterize the constraints on overlapping regions between neighboring cells, each cell's resource, the traffic generated within each cell, ping-pong margin between mutual neighbors and minimum/maximum allowable handover thresholds for acceptable call quality.

A major disadvantage of the above-identified two prior art solutions is that extensive data processing and calculations are required in order to determine the handover threshold for the serving cell/neighbor cell combinations.

Johansson et al discloses a solution for a soft handover procedure in an international patent application [4]. This handover procedure is essentially divided into two sub-procedures: a first preliminary portion of the handover sequence and another remaining portion. Time-critical handover activities such as receiver establishment for listening mobile user equipment and Layer 1 (L1, physical layer) uplink synchronization for the user equipment are performed during the preliminary handover sub-procedure whereas the remaining handover activities are initiated and finished during the second sub-procedure. The second (conventional) sub-procedure is associated with a fixed handover-triggering threshold. However, a dynamic threshold is employed for the preliminary portion of the handover sequence. This dynamic threshold depends on a probability that the user equipment will engage in soft handover and on a probability weight.

In order to determine the dynamic threshold of the document [4], statistical information of handover history of other mobile user equipment is required. Thus, a lot of prior user equipment measurements have to be stored and processed in order to calculate a present dynamic threshold. In addition, there is a compromise between two conflicting goals in determining the probability weight needed for calculating the dynamic threshold. Firstly, a large weight is required to make certain that the preliminary portion of the handover sequence is not started too late. However, a small weight is desired so that handover will not be started too soon and then waste hardware resources.

SUMMARY

Briefly, one of many as of the disclosed technology involves a cell-differentiated handover procedure in a cellular communications system. The cells, or at least a portion thereof, of the communications system are divided or classified into multiple handover-related classes. This classification is performed based on the radio coverage characteristics of the respective cells. Each such cell class is then associated with a unique handover parameter or threshold or a unique set of multiple handover parameters. These handover parameters are then employed in different handover procedures and events used for the mobile user equipment connected to the system. The parameters will basically, at least partly, determine the geographical size and coverage of a handover region for a cell. By then employing different parameters for different cell classes, the resulting size of the handover region can be adapted for the particular characteristics of the cells.

Since the classification of cells is performed based on their radio coverage characteristics, the classification may depend on an expected change in signal and link quality experienced by connected user equipment as it moves between cells. Thus, the classification preferably divides the cells into the different classes based on how the transmitted signal quality on average will change over traveled distance. For example a first cell class could include cells for which the user-measured signal quality changes abruptly and quickly as the user equipment moves between cells. A second class could then include cells where the signal quality measured by a traveling mobile user equipment will only slowly change over distance. By employing different handover parameters for different cell classes, the handover region for each such cell class can be adapted by a suitable choice of the handover parameter values. Then the size of the handover region is preferably adapted so that it will be large enough for a travelling mobile unit to measure, report, configure and synchronize to the destination cell before the link to the old cell has to be dropped due to too low signal quality. However, the region size should not bee too large since then the user equipment will be connected to several cells during an unnecessarily, from the point of view of completing the handover procedure, long period of time and, thus, occupy communications resources that could have been better used for other purposes and users.

In one embodiment, the cellular communications system comprises sectored sites, i.e. each base station uses a sectored antenna arrangement to provide communications services to multiple associated cells. In such a system, the radio coverage characteristics of the cells can differ depending on whether the user equipment moves between cells of different sites, a so-called soft handover, or moves between cells of the same site, denoted softer handover. Since the angular antenna signal quality diagram typically drops faster per meter than the distance-dependent path loss, the user-measured signal quality will change much more rapidly when moving between cells of the same site compared to inter-site movement. As a consequence, a first cell class could comprise cells of the same site and a second cell class then comprises cells of other sites. The handover parameter(s) associated with the first class is (are) then preferably larger than the corresponding parameter(s) of the second class to cope with and compensate for the more abrupt changes in measured signal quality for the first cell class.

A similar situation occurs in a cellular communications system with macro cells and micro or pico cells. A macro cells generally covers a large geographical area and for such a cell the signal quality, e.g. as represented by Received Signal Code Power (RSCP), ratio of energy per modulating bit to the noise spectral density (Ec/No), path loss, or some other signal quality parameter measurable or at least estimable by a mobile user equipment, will typically gradually and slowly decline as the user equipment moves away from the base station. A macro cell is often found in rural areas. However, a macro cell may also be found in urban regions where its associated antenna arrangement typically is situated above roof top in order to cover a relative large geographical area. Such a macro cell is then typically denoted an umbrella cell in the art. However, a micro/pico cell generally covers a much smaller geographical area and the propagation conditions and radio coverage of the these cells may rapidly and abruptly change for a traveled distance. These cells are typically situated in urban regions, e.g. with associated antenna arrangements below the roof top level or in buildings. In such a case, moving around a street corner or entering/leaving a building can result in a sudden change in the experienced signal quality for the user equipment. Thus, a first cell class in this situation could include micro and pico cells and a second handover-related class then includes macro cells. The handover parameter(s) associated with the first class is (are) then preferably larger than the corresponding parameter(s) of the second class.

The handover parameters are used together with measurements of the signal quality for a communications link between the user equipment and a base station of a current best serving cell to which the user equipment is connected and corresponding signal quality measurements for a communication link to a base station of a potential destination cell. A comparison between the measured signal qualities using a handover parameter associated with the cell class of the potential destination cell is then used for determining whether a handover event should be triggered. Such an event could include, adding the destination cell to the active set, i.e. connect the user equipment to this cell, remove a cell from the active set, i.e. disconnect the user equipment from the cell, replace cells in the active set or a change of the best serving cell if the user equipment currently is simultaneously connected to several cells. In these different handover events a single handover parameter of the suitable cell class could be used. Alternatively, different handover parameters are used for different events, so that the cell classes have multiple associated unique handover parameters.

The embodiments offer least the following advantages:
  Enables usage of handover parameters that are adapted for the radio coverage characteristics of the individual cells in cellular communications systems;
  Reduces the risk of loosing a communications link for a mobile user equipment and, thus, of dropping an ongoing communications service or call; and [0025] Reduces unnecessary occupation of communications resources caused by too large handover regions.

These and other advantages offered by the embodiments will be appreciated upon reading of the below description of the embodiments.

SHORT DESCRIPTION OF THE DRAWINGS

The embodiments and their advantages thereof, may be understood by making reference to the following description taken together with the accompanying drawings, in which:

FIG. 11 is a flow diagram of an example handover parameter assigning method according to an aspect of the present invention;

FIG. 12 is a flow diagram of an example method of modifying a list of potential handover cells according to an aspect of the present invention;

FIG. 13 is flow diagram illustrating example additional steps of the handover list modifying method of FIG. 12;

DETAILED DESCRIPTION

Figure 1:
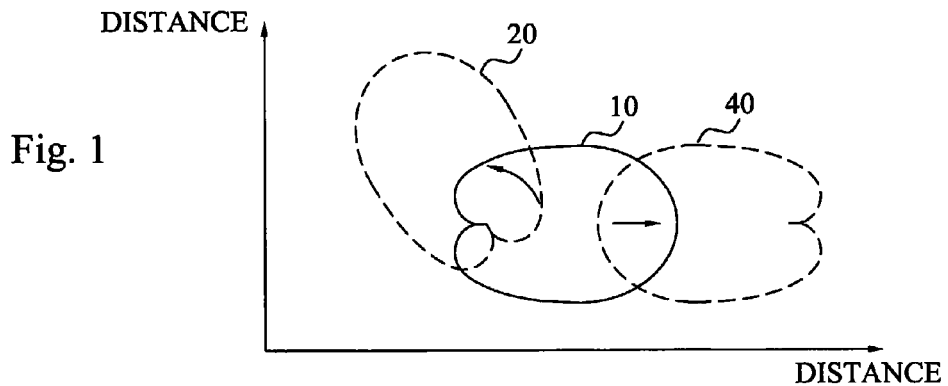
FIG. 1 is a schematic diagram illustrating a soft and a softer handover scenario for a cellular communications system with 3-sector cells.

Throughout the drawings, the same reference characters will be used for corresponding or similar elements.

One or more aspects of the disclosure generally relate to handover in cellular communications systems and particularly to a cell-differentiated handover in such systems.

In one aspect, cells of a cellular communications system are divided or classified into multiple, i.e. at least two, handover-related classes or sets. This division of cells can be performed based on the radio coverage characteristics or properties of the cells. The different cell classes are then associated with a respective unique handover parameter or a unique set of multiple handover parameters that will be used in handover procedures for user equipment or other mobile units connected to the system. These parameters or thresholds are typically employed in different handover triggering conditions or events and basically can, at least partly, determine the geographical size and coverage of a handover region for a cell. By then employing different parameters for different classes, the resulting size of the handover region can be adapted for the particular characteristics of the cells.

In the description, the expression "cell" refers to a certain geographical area that provides communications services by communications resources to user equipment present in the area and connected to the cell. The cell is typically associated with a base station or similar antenna-comprising arrangement for providing the (radio) resources. The geographical size of the cell is determined by the radio propagation conditions and normally decline in signal and link quality as one moves away from the base station. Thus, within the cell area, the radio coverage is typically good enough to enable the communication between the user equipment and the base station. However, as one approaches and passes the borders of a cell the signal quality can be too low to perform the communications service.

A cell may cover a relative large geographical area, typically denoted macro cell in the art, if its associated base station is able to provide a communications link to user equipment with a high enough quality over a large area. These macro cells could typically be found in rural areas, where the expected traffic situation will be low and the probability that several users simultaneously are present in and connected to a same cell is relative low. However, a macro cell may also be found in more user-dense urban regions where its associated antenna arrangement typically is situated above roof top in order to cover a relative large geographical area. Such a macro cell is then typically denoted an umbrella cell in the art. Correspondingly, a cell could cover a relative small geographical area, generally denoted micro or pico cell in the art. Such cells are typically situated in dense urban regions, where the probability that many users simultaneously are present in a same area is relative high. In these user-dense urban regions, the antenna arrangement of a micro or pico cell is typically provided below the roof top level or in buildings.

A cell could also be a sub-area of a larger base station- or antenna-associated area. For example, the radio coverage area of a base station can be divided into multiple sectors or cells. Such cells (sectors) within one site or area are typically served by the same base station having a X-sectored antenna, where X is the number of cells in the site, e.g. 3, 6 or 12. A radio link within a cell can then be identified by a single logical identification belonging to that cell. Thus, also such a sector can be a cell.

In order to provide a seamless crossing between cells, the radio coverage areas of two neighboring cells typically at least partly overlap.

As mentioned above, the classification of cells may be performed based on the radio coverage characteristics of respective cells. Such a classification can then depend on an expected change in signal and link quality experienced by connected user equipment as it moves between cells. For example, in rural areas with macro cells, the signal quality, e.g. as represented by Received Signal Code Power (RSCP), ratio of energy per modulating bit to the noise spectral density (Ec/No), path loss, or some other signal quality parameter measurable or at least estimable by a mobile user equipment, will typically gradually and slowly decline as the user equipment moves away from the base station. However, in a dense urban area with micro/pico cells, the corresponding signal quality may change rapidly and abruptly. For example, moving around a street corner or entering/leaving a building can result in a sudden change in the experienced signal quality for the user equipment.

The radio coverage characteristics then reflects such propagation conditions and expected signal quality changes when moving with the radio coverage area of the cell and between cells.

In order to facilitate understanding of one more aspects of the present invention, the problems associated with conventional techniques using fixed and identical handover parameters for all cells are surveyed with reference to FIGS. 1 to 6.

Starting with FIG. 1, a schematic overview of a portion of a cellular radio communications system employing sectored sites is illustrated. In this system, each base station has a 3-sectored antenna and thus provides communication services to three cells. Thus, a first site includes three cells, of which only two cells 10, 20 are illustrated in the figure. Correspondingly, a second site includes three cells, of which a single cell 40 is shown in order to simplify the illustration.

Figure 2:
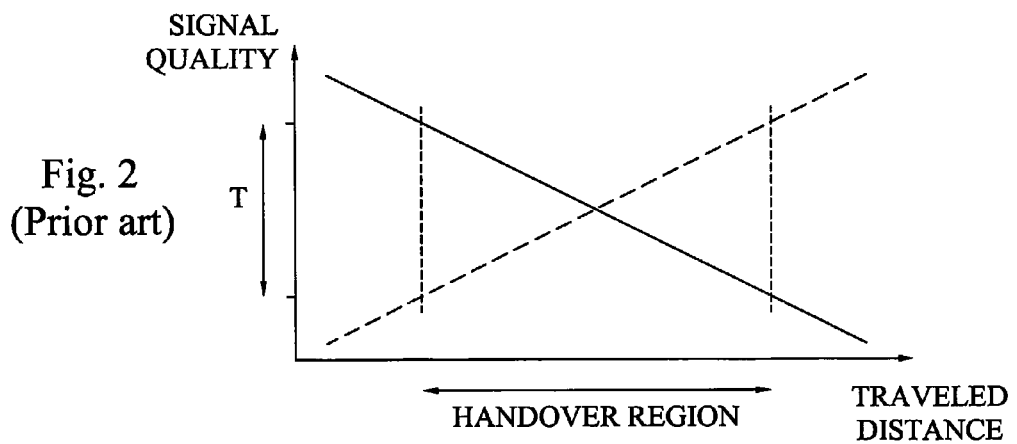
FIG. 2 is a diagram illustrating a resulting handover region for the soft handover scenario of FIG. 1 employing a conventional solution.

Imagine two different handover scenarios. In the first case, a mobile user equipment is currently present and connected to the cell 10 but starts to move away from the base station and into the cell 40. FIG. 2 illustrates how the (average) radio coverage or signal quality, represented as power gain, experienced by the user equipment will change based on the traveled distance. The unbroken line in FIG. 2 refers to the change (decline) in signal quality for a (downlink) communication link or channel between the user equipment and the current source cell 10. The corresponding signal quality change (increase) for a link from the destination cell 40 is represented by the broken line in the figure.

A handover procedure or event is typically triggered by a comparison of mobile-assisted signal quality measurements and a handover threshold or parameter (T). For example, including a cell 40 in the so-called active list or set that comprises cells to which the user equipment currently is connected is typically performed based on such a comparison. Let Q denote the signal quality of the current best serving cell 10 measured by the user equipment and P is the corresponding measured signal quality on a channel from the base station of the destination cell 40. Then the trigger condition could be that the cell 40 should be entered in the list if $P > Q - T$.

Thus, when the user equipment moves away from the base station serving the cell 10 and approaches the cell 40, the experienced signal quality (Q) from the cell 10 gradually declines whereas the signal quality (P) measured for the cell 40 gradually increases. Eventually, P will be larger than Q-T, see the leftmost broken vertical line in FIG. 2, and the user equipment may connect to the base station or Node B of the destination cell 40. This trend in signal quality change continues as the user equipment comes closer to the base station of the cell 40. Subsequently, the destination cell 40 may become the best serving cell and the user equipment should primarily use it for communications purposes. However, the cell 10 typically still remains in the active set. Finally, the signal quality of the cell 10 will be too low so that it is removed from the active set, represented by the rightmost broken vertical line in the figure. A resulting handover region could then be defined as the area between these vertical lines, i.e. the area where the signal quality of the two cells 10, 40 is within T dB from each other (if the signal quality is represented by power gain in the unit dB or Signal-to-Interference Ratio (SIR)).

Figure 3:
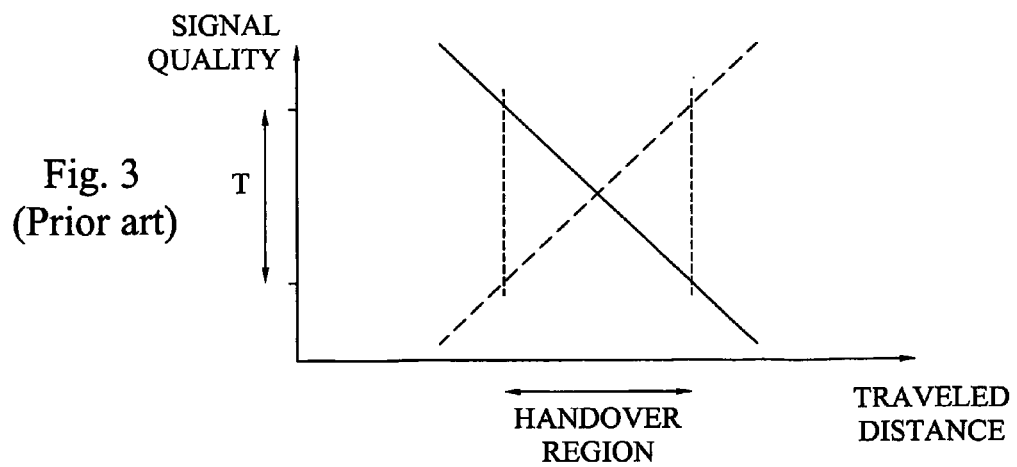
FIG. 3 is a diagram illustrating a resulting handover region for the softer handover scenario of FIG. 1 employing a conventional solution.

The corresponding diagram over signal quality change when the user equipment performs an angular movement from cell 10 into the cell 20 of the same site is illustrated in FIG. 3. However, since the angular antenna diagram typically drops faster per meter than the distance-dependent path loss (FIG. 2), the measured signal qualities will change (drop for cell 10, unbroken line, and increase for cell 20, broken line) more rapidly compared to the situation in FIG. 2. Employing the same threshold T as for the inter-site handover in FIG. 2 according to conventional techniques will then result in a considerably smaller handover region. In other words, the time for performing a handover procedure for the user equipment passing the region will be much shorter. In the art, FIG. 2 generally illustrates the situation for a soft (inter-site) handover procedure whereas FIG. 3 relates to a softer (intra-site) handover procedure.

Note, however, that shadow fading and other local effects could affect and even dominate the handover region definition for a 3-sectored antenna arrangement.

Figure 4:
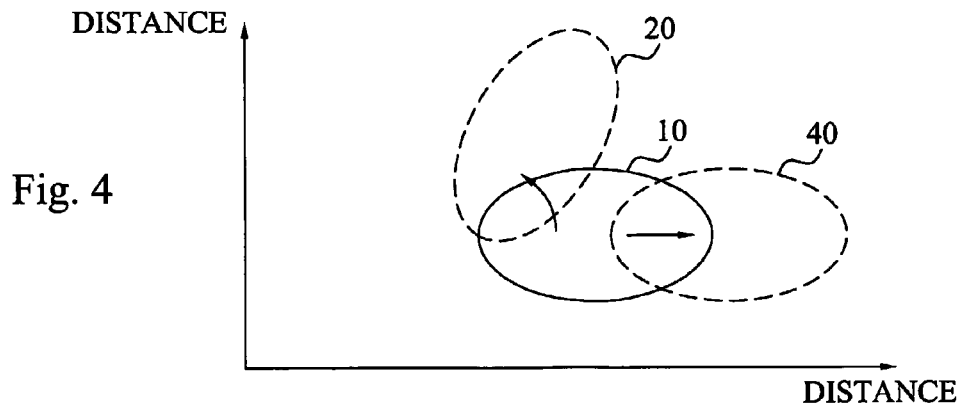
FIG. 4 is a schematic diagram illustrating a soft and a softer handover scenario for a cellular communications system with 6-sector cells.
Figure 5:
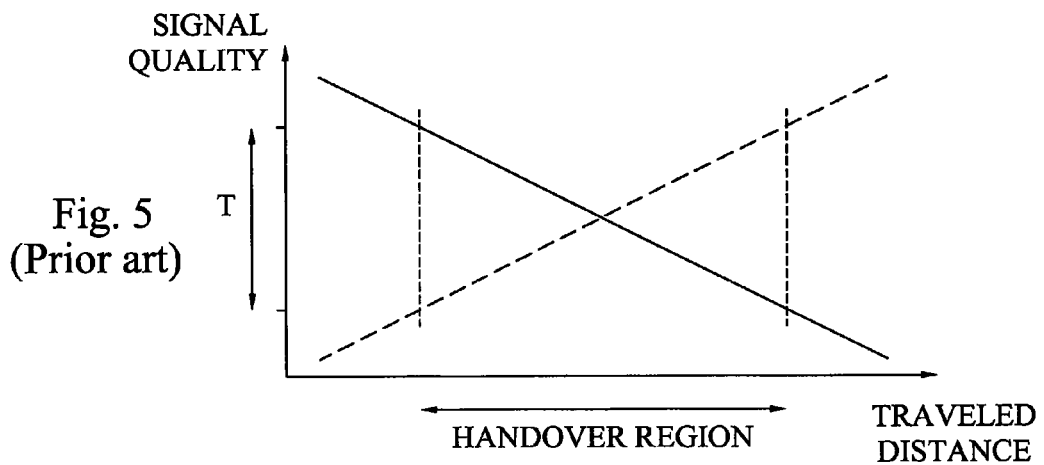
FIG. 5 is a diagram illustrating a resulting handover region for the soft handover scenario of FIG. 4 employing a conventional solution.
Figure 6:
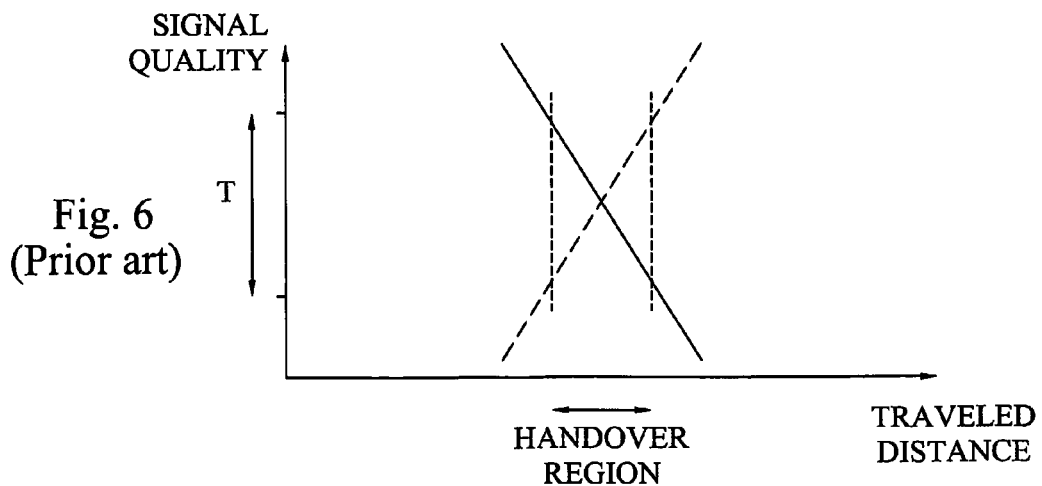
FIG. 6 is a diagram illustrating a resulting handover region for the softer handover scenario of FIG. 4 employing a conventional solution.

FIG. 4 illustrates a corresponding portion of a cellular communications system as FIG. 1. However, this system includes six cells per site or base station and thus employs 6-sectored antenna arrangements. FIG. 5 represents the (soft) handover from the cell 10 to the cell 40, i.e. handover between cells of different sites (compare with FIG. 2). FIG. 6 likewise illustrates the situation for the (softer) handover from the cell 10 to the cell 20, i.e. handover between cells of the same site (compare with FIG. 3). FIG. 5 will be more or less identical to FIG. 2 and, thus, results in a similar size of the handover region using the same handover threshold T. However, for the angular movement between cells 10, 20 of the same site, the average radio coverage and signal qualities will change much more rapidly for the six cells per site scenario compared to three cells per site. As a result, a very small handover region is obtained using the same threshold T. This effect is more emphasized for higher sectorization, i.e. employing more cells per site, and then results in an even smaller handover region. Moreover, shadow fading and other local effects will have less impact on the softer handover region for these high-sectored cases.

A problem is then how to determine a suitable value for the handover threshold T. Assume that the threshold T is determined and adapted for soft (inter-site) handover so that the user equipment will have time enough to measure, report, configure and synchronize to the new cell 40 before the link to the old cell 10 has to be dropped due to too low signal quality. However, then the resulting handover region for the softer (intra-site) handover will be too small using this inter-site-adapted threshold value. As a consequence the user equipment may not have time to complete the handover procedure when travelling towards the new cell 20 and the link to the old cell 10 might be lost, resulting in a drop of an ongoing call.

However, if the threshold T instead is adapted for intra-site handover, the resulting handover region for inter-site handover will be very large. Due to this too large region, the user equipment may simultaneously be connected to (downlink) radio channels from several cells 10, 40 during a rather long period of time, i.e. longer time period than required for completing the handover procedure. Thus, there is a waste in resource utilization for the user equipment that unnecessarily occupies communications resources, which may be better used for other purposes and by other users.

In one or more emboli this and other problems are addressed by classifying cells into different handover-related classes and then employing different handover parameters for the different classes, where the parameters have been adapted to the radio coverage characteristics of their associated cell class.

Figure 7:
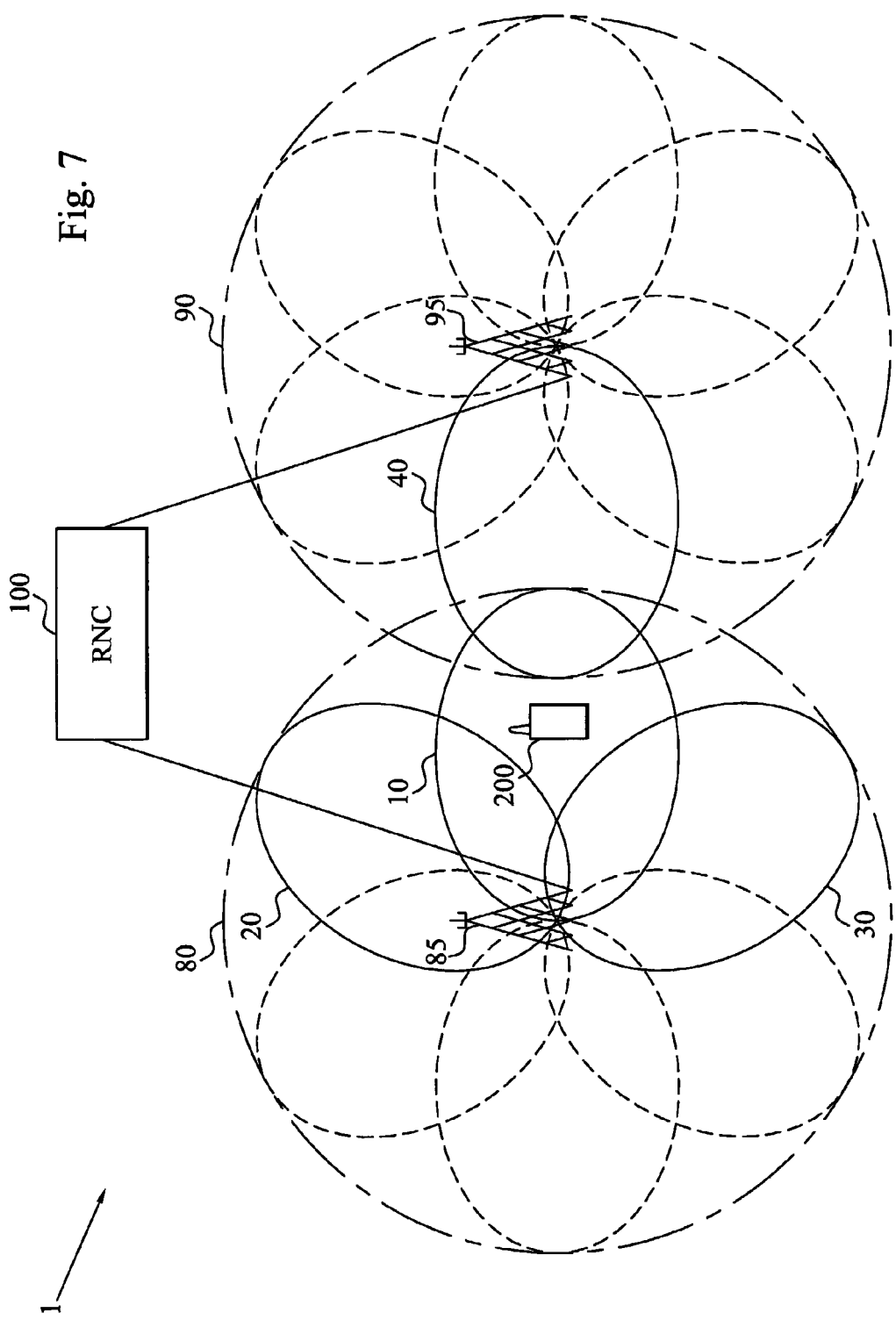
FIG. 7 is a schematic overview of a portion of a sectored cellular communications system according to an embodiment of the present invention.

FIG. 7 is a schematic overview of a portion of a cellular communications system 1, to which one or more embodiments of the present invention can be applied. This system 1 comprises sectored sites 80, 90, exemplified with six cells 10-30, 40 per site 80, 90. A first base station 85 or Node B manages six associated cells including cells 10-30, which have been provided with reference signs in order to simplify the illustration. In one of these cells 10, a mobile unit or user equipment 200 is present and conducts communication with the base station 85. The system 1 also comprises a second site 90 with a base station 95 having six associated cells including cell 40. The base stations 85, 95 are further in connection with a control node, Base Statio Controller (BSC) or Radio Network Controller (RNC) 100. This control node 100 supervises and coordinates various activities of the plural base stations 85, 95 connected thereto and typically participates in any handover procedures for the user equipment 200.

In a first embodiment, the cells are classified into a first handover-related class that comprises cells 20, 30 of a same site 80 as the best serving cell 10, to which the user equipment 200 presently is connected and a second class that comprises cells 40 of other sites 90. The first class is then associated with a first handover parameter or a first set of multiple handover parameters and a different second parameter or parameter set is used for the second class. In a preferred embodiment, the handover parameter(s) of the first class is (are) larger than the corresponding parameter(s) of the second cell class. As a result, the handover region when moving into a cell 20, 30 of the same site 80 can then be in the same order of size as the handover region for inter-site handover, e.g. from the cell 10 to the cell 40. Thus, the available action time for performing a handover procedure when passing the region will be in the same order of size.

Figure 8:
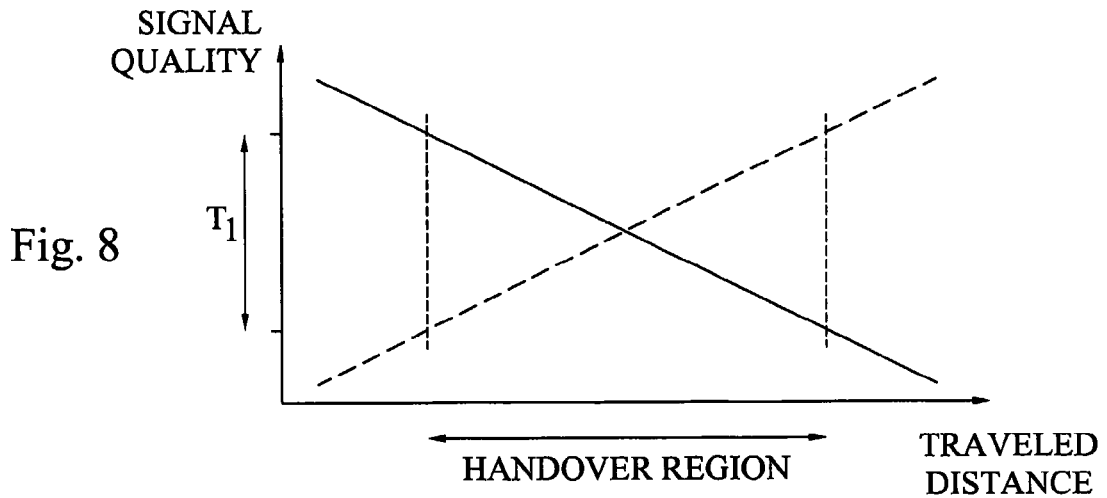
FIG. 8 is a diagram illustrating a resulting handover region for the soft handover scenario of FIG. 4 employing example teachings of the present invention.
Figure 9:
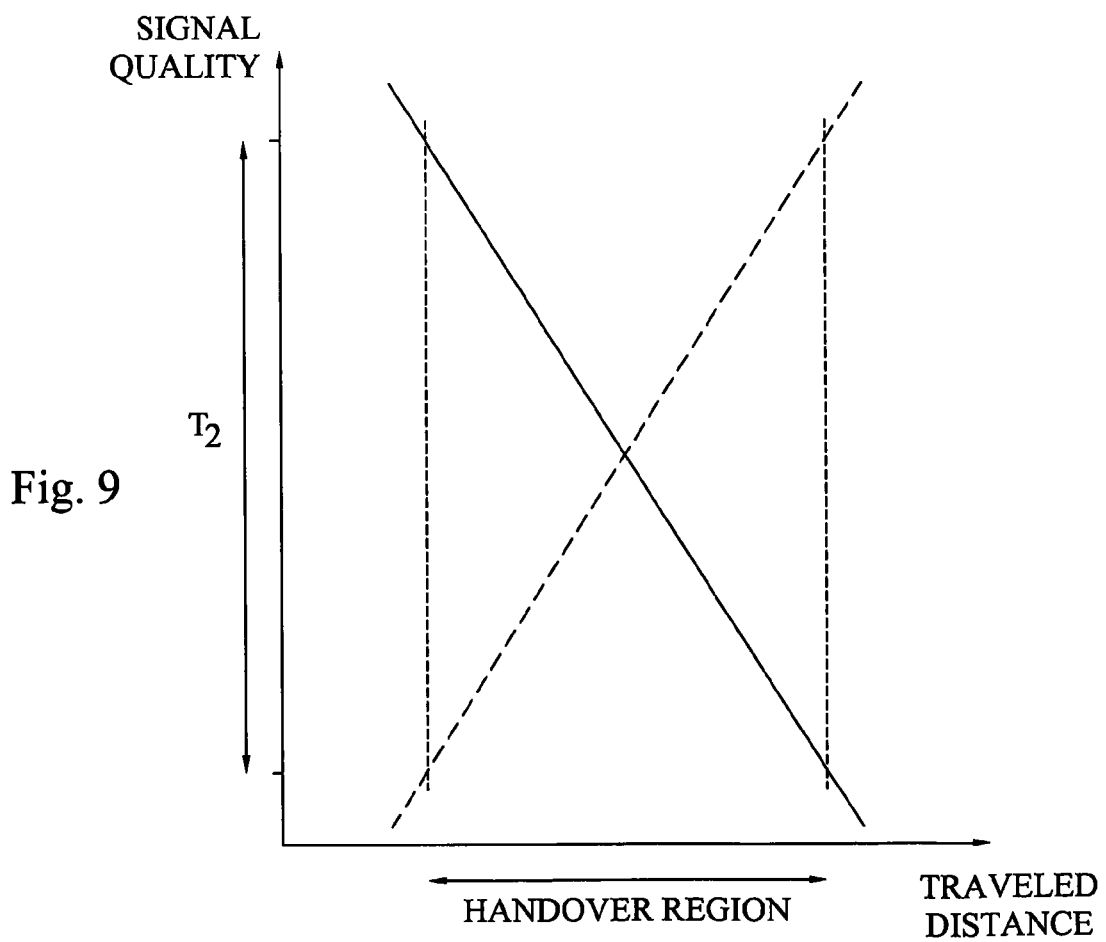
FIG. 9 is a diagram illustrating a resulting handover region for the softer handover scenario of FIG. 4 employing example teachings of the present invention.

FIGS. 8 and 9 illustrate signal quality diagrams for the 6-sector site illustrated in FIG. 4 when employing the present invention. With reference to both FIGS. 4 and 8, the resulting average signal quality measured by the user equipment on a link to the source cell 10 is illustrated in FIG. 8 as an unbroken line whereas the signal quality for a link to the destination cell 40 is represented by unbroken line for the inter-site handover. For this class of destination cell, i.e. cell of other sites, a first handover parameter or threshold $T_1$ is used for determining when a handover procedure or event is to be triggered and, thus, affects the size of the handover region. In contrast, in FIG. 9 the intra-site handover from the source cell 10 to the destination cell 20 is illustrated. Since in this case the destination cell 20 belongs to the same site as the source cell 10, a second handover parameter $T_2$ is used in the handover procedure. By employing a larger parameter $T_2$ for intra-site handover than for inter-site handover, the handover regions for the two scenarios may be in the same order of size. The user equipment will then have time enough to be able to complete the handover procedure before the link to the source cell 10 will drop due to insufficient signal quality and radio coverage for both types of handover. FIGS. 8 and 9 that employ the teachings of the invention should be compared to the corresponding FIGS. 5 and 6 conventional techniques. Thus, by using the classification of cells it is possible to obtain large enough handover regions for all types of cells without the drawbacks that other cell types will have unnecessarily large or too small handover regions.

Returning briefly to FIG. 7, in another embodiment a first handover-related class includes only neighboring cells 20, 30 of the same site 80 as the current source cell 10. The second cell class then comprises non-neighboring cells of the same site 80 (illustrated with broken lines in the site 80) and cells 40 of other sites 90. The handover parameter(s) of the first class is (are) then preferably larger than the corresponding parameter(s) of the second class in order to compensate for the more rapidly changing radio coverage (signal quality) when moving between neighboring cells of the same site compared to other cells.

In yet another embodiment, a first handover-related class or cell group comprises high-sectored cells, i.e. cells belonging to a site that comprises many cells, e.g. sites comprising more than three cells. A second cell class could then include low-sectored cells, e.g. cells belonging to a site with three or less associated cells, and non-sectored cells. Similarly to above, the parameter(s) or threshold(s) used in handover procedures for the first class is (are) preferably larger than the parameter(s) for the second class.

Figure 10:
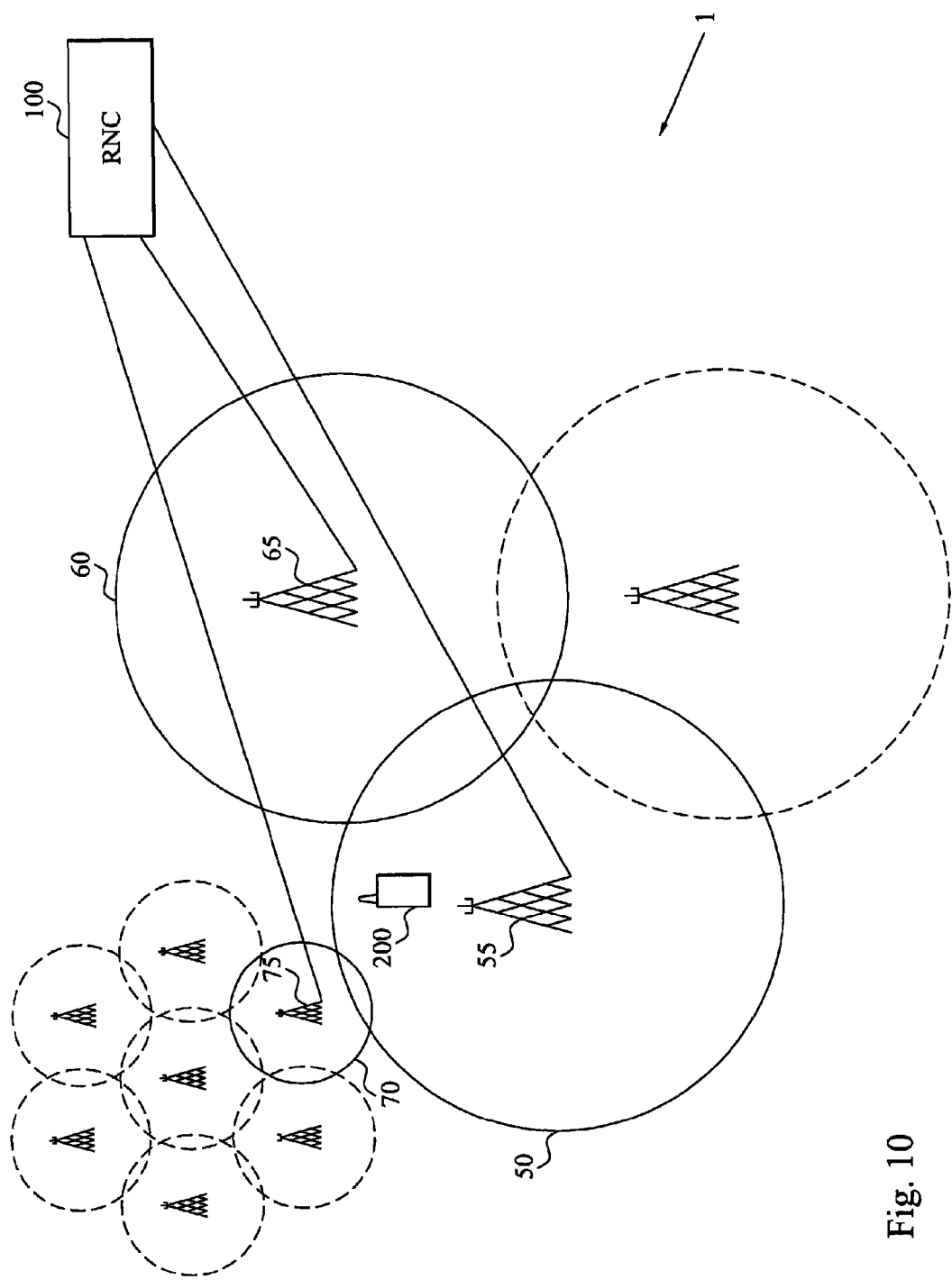
FIG. 10 is a schematic overview of a portion of a cellular communications system with macro and micro cells according to an embodiment of the present invention.

FIG. 10 illustrates another example of a portion of a cellular communications system 1, to which the embodiment present invention can be applied. This system 1 comprises cells including cells 50, 60, 70 with different sizes of their respective radio coverage areas. As was briefly discussed above, each cell 50-70 is associated and managed by a respective base station 55, 65, 75 that provides communications services to connected mobile user equipment 200. The base stations 55, 65, 75 are further in connection with a control node or RNC 100, as in FIG. 7.

The relative geographically large macro cell 50, 60 are typically situated in rural areas. However, macro cells 50, 60 can also be found in urban regions. Such macro cells 50, 60 typically have high-placed base stations 55, 65 with a possibility to transmit radio signals using a high signal power in order to reach all of the large area of the cell 50, 60.

The system 1 also comprises so-called micro or pico cells 70, with a relative small radio coverage area compared to the macro cells 50, 60. A micro/pico cell 70 is typically managed by a small base station 75, e.g. placed on a house or a building in a city, often with the antenna arrangement positioned below roof top level. Such cells 70 are often found in dense urban areas. The maximum transmitted signal power of a base station 75 of a micro/pico cells 70 is normally comparatively lower than for a base station 55, 65 in a macro cell 50, 60.

When the user equipment 200 moves between macro cells 50, 60, the radio coverage and measured signal quality typically slowly changes. In such a case, small handover parameter(s) can be employed for inter-macro handover procedures and the user equipment 200 still will have time enough to complete the handover before a communications link is lost.

However, when moving between micro cells 70, the radio coverage can abruptly drop or change over just a small traveled distance. If a same handover parameter as for macro cells 50, 60 was to be used, a call or another ongoing communications service may have to be dropped or lost before the handover procedure is completed due to the sudden change in radio coverage. One solution is then to employ different handover parameter(s), typically larger parameters, than for the macro cell case. The user equipment 200 will then be able to complete the handover procedure before the connection to the source cell is lost.

Thus, in this embodiment, a first handover-related class 15 comprises micro and pico cells 70 with a small geographical area and a second class comprises macro 50, 60 with a large geographical area. The parameter(s) for the first class is (are) then preferably set larger than the parameter(s) for the second class.

Note though that in some situation it could be possible that the (average) radio coverage of a cell experienced and measured by the user equipment could abruptly change for cells with large geographical coverage areas. In addition, also for a micro or pico cells, the user-measured signal quality could slowly change when moving between such micro/pico cells. Thus, in such a case a first class could comprise cells (macro and/or micro/pico cells) where the radio coverage changes suddenly per traveled distance and a second class could then include cells (macro and/or micro/pico cells) where the radio coverage changes slowly per the same traveled distance.

Furthermore, cells, in which the user-experienced signal quality varies much over time at a certain geographical distance, typically near the cell border, from the associated base station, could be classified into a first handover-related class. A second class could then include cells where the signal quality on average does not change much over time. Then the handover parameter(s) for the first class is (are) preferably larger than for the second class.

The division of cells into multiple handover-related classes based on their respective radio coverage characteristics and usage of different handover parameters for the classes can also be applied to cellular communications system, such as Global System for Mobile communications (GSM) and Digital-Advanced Mobile Phone System (D-AMPS), employing hard handover procedures and/or inter-frequency or inter-carrier handover. Unlike soft and softer handover that provides a seamless handover where communications links are added and abandoned in such a manner that the user equipment always keeps at least one radio link to a base station, hard handover is a category of handover procedures where all "old" radio links in the user equipment are abandoned before the "new" links are established. Typically, the main objective with handover parameters in mobile-assisted measurements of link quality for the purpose of hard handover is to avoid ping-pong effects between cells. The risk for ping-pong handovers decreases with an increased risk of dropping the connection to the communications system. Ping-pong between cells of a same site is not as critical as ping-pong between different base stations, i.e. cells of different sites. As a consequence cells could then be classified into sectored cells (class 1) and non-sectored cells (class 2) or, alternatively, into high-sectored cells (class 1), e.g. more than three cells per site, and low-sectored, e.g. less or equal to three cells per site, and non-sectored cells (class 2). Different handover parameters and offsets are then employed for the two classes, preferably by using a lower ping-pong offset for cells of the first class than for cells of the second class.

Thus, one or more embodiments of the disclosed technology can typically be applied to different types of communications systems including a GSM system, different CDMA systems, a Time Division Multiple Access (TDMA) system, a Frequency Division Multiple Access (FMDA) system or any other systems utilizing whatsoever multiple access method, e.g. a Orthogonal Frequency Division Multiple Access (OFDMA) system.

Although the description hitherto mainly has been described with reference to classifying cells into two different handover-related classes, this teaching can be applied also for more than two classes. For example, a first handover-related class could include high-sectored cells, e.g. the cells of a site having more than three associated cells, a second class comprises low-sectored cells, the cells of a site with three or less cells, and a third class includes non-sectored cells. If the handover parameter for the first class is denoted $T_1$ and the parameters for the other two classes are $T_2$ and $T_3$, respectively, these parameter values are preferably determined so that $T_1 > T_2 > T_3$. Also a combined classification of cells into micro/macro cells and into cells of the same site/other sites could be employed. For example, class 1 comprises micro/pico cells of the same site, class 2 comprises micro/pico cells of other sites and class 3 and 4 represent macro cells of the same site and of other sites, respectively. Then the handover parameters for the different classes could be determined so that $T_1 > T_2 > T_3 > T_4$, if the subscripts represent the above-mentioned class numbers.

The classification of cells into multiple handover-related classes can be performed during the cell planning or deployment phase for a communications system. The division of cells could then be performed manually by a network operator, e.g. determining that cells of a same site should have a first associated handover parameter and that cells of other sites should use a second different parameter. However, different radio coverage and propagation prediction algorithms and tools could alternatively or in addition be employed for estimating radio coverage characteristics of cells and defining a suitable division of the cells in the system based on this estimation. This updating of cell classification could be automatically performed in order to optimize the selection of classes and/or handover parameters.

The classification of cells could be fixed so that once a certain cell classification has been determined it is continuously used throughout the system. Once a new cell is added to the system, it is associated with one of the existing classes and is assigned the handover parameter(s) of that class. Alternatively, a dynamic classification of cells could be employed. Then the cells of the system are firstly classified using a certain first classification using their respective radio coverage characteristics. Subsequently, the cells, or a portion thereof, in the system can be re-classified using the same first classification or another classification, e.g. based on new measurements of traffic situations in the system or changes in the radio coverage characteristics of the cells. The new classification can then adapted as the traffic conditions in the system changes.

The actual value of the handover parameters or thresholds for the handover-related classes could be determined based on history data and estimations of previous handover procedures in the system. The value could be based on data such as; change in radio coverage, signal and link quality for a cell per traveled distance, expected average traveling speed of moving mobile units and other data traditionally used by the network operator for determining handover thresholds. As for the classification of cells, the value of the handover parameters for the different cell classes could be fixed or could be updated and adapted based on new measurement data. The basic idea with different parameter values for different cell classes is that user equipment in general should have time to complete a handover procedure before losing a communications link and dropping an ongoing communications service. Generally, for cell classes with sudden changes in radio coverage a larger parameter value is used than for cell classes with slowly distance-dependently changing radio coverage.

For a cellular communications system, e.g. a system utilizing Code Division Multiple Access (CDMA), there is typically several different handover-related triggering events or conditions. In such a case, a handover parameter could be used for all such events for a cell class or the events, or at least some of them, could employ different (unique) handover parameters. In such a case, each handover-related cell class could be associate with a set of these multiple handover parameters.

In this handover function in CDMA systems, the mobile user equipment typically either periodically or as triggered by certain events measures the link or signal quality of pre-selected transmission links from various base stations. These pre-selected links could be a broadcast, beacon or pilot channel, e.g. Node B Common Pilot Channel (CPICH) or Broadcast Control Channel (BCCH), provided by the base stations of the respective cells. The control node or RNC typically informs the user equipment, of which cells, the so-called monitored cell, that it should measure on. These monitored cells are preferably selected by the RNC by investigating which cells that are neighbors to the cells in the active set, i.e. the cell(s) to which the user equipment is connected. Thus, the user equipment performs measurements of the cells in the monitored set but also of the cells in the active set. The teaching of the present invention is particularly advantageous when the user equipment only is connected to a single size, i.e. the active set size is one cell. In these cases, a malfunctioned handover procedure will result in a dropped ongoing call or communications service, whereas if the user equipment is simultaneously connected to multiple cells, the call may continue even if one of the communications links is lost.

A first handover event (radio link addition) could be that a new cell (not in the active set) has entered reporting range defined based on the measured and filtered pilot signal (P) from the destination cell, the corresponding signal quality (Q) of the current best serving cell and a first handover parameter ($T_A$) associated with the cell class of the destination cell. Thus this new destination set could be entered into the active set for the user equipment if $P>Q-T_A$. A second handover event (radio link removal) occurs when the measured or determined signal quality from a base station falls below a threshold, e.g. if $P<Q-T_A$. However, in order to avoid a recurrent addition and deletion of cells from the active set and, thus, establishment and removal of communications links, a different handover parameter ($T_D$) is preferably used for this handover event. Thus, a cell is removed from the active set if $P<Q-T_D$, where $T_D$ preferably is larger than $T_A$. Further such events could be that one cell leaves and one cell enters reporting range (replacement of cells in the active set) and change of a best serving cell, i.e. a new cell is now measured with the highest signal quality. A more detailed discussion of handover events and conditions is found in the 3GPP document [5].

Thus, the handover-related classes could each be associated with a unique handover parameter or a unique set of multiple handover parameters, e.g. employed in the different handover events discussed above.

FIG. 11 is a flow diagram illustrating an example method of assigning handover parameters for a cell in a cellular communications system. The method starts in step S1, where the cells in the system, or at least a portion of the cells, are classified and divided into multiple handover-related classes based on the radio coverage characteristics of the cells. Each such cell class then preferably includes multiple cells. This classification is typically performed during the deployment and cell planning phase of system management. The classification can be fixed and is subsequently continuously used in the system, or could be periodically or intermittently updated.

In a next step S2, the class for a cell is determined. This determination is preferably performed when a monitored set report is transmitted to the user equipment and/or upon a request from e.g. the mobile user equipment, which then notifies the control unit, RNC or other system unit that performs this class determination of the identifier of the cell. In this determination, the control unit preferably uses neighbor cell lists that are accessible by the control unit for each cell in the system. Note further that one and the same cell can in a first situation belong to first class but belongs to a second class in another situation, depending on the position of the requesting user equipment. Briefly returning to FIG. 7, assume that the first class comprises cells of the same site and the second class comprises cells of other sites. If a user equipment currently is present and connected to the cell 20 and intends to move into the cell 10, this destination cell 10 will belong to the first cell class. However, if the user equipment instead is in the cell 40 and wants to move into the cell 10, it will belong to the second class. Thus, information about both the source and destination cell is preferably used for the class determination of step S2. The parameter(s) associated with the determined class is then assigned to the relevant destination cell in the step S3. The parameter(s) may then be used either by the user equipment and/or the control unit for e.g. triggering a handover event. The method then ends.

The steps S1 to S3 of FIG. 11 are typically performed in a unit or node of the communications system, such as the RNC or other control node. Furthermore, the cell classification of step S1 could at least partly be executed using a cell planning unit or tool, such as TEMS™ by Ericsson.

FIG. 12 is a flow diagram of an embodiment of modifying a list or set of active cells for user equipment. The method starts in step S10 where the user equipment measures the signal strength or quality on a communication link or a dedicated channel selected for measurements associated with the potential destination cell and preferably on a link of the current best serving cell. This downlink could be a CPICH, BCCH or some other pilot or broadcast channel. The measurements could be performed periodically or at an event e.g. upon reception of measurement control messages from the control node or RNC. In addition multiple signal quality measurements can be performed to obtain more quality data and also other metrics, not directly measurable, can be used in this context. In a next step S11, the user equipment receives a handover parameter for the potential cell from the RNC. The parameter is preferably received from the RNC together with the monitored cell list that identifies the cells, on which the user equipment should measure. The parameter has preferably been determined based on the radio coverage characteristics of the cell in a cell classification procedure. Furthermore in this step S11, more than one handover parameter associated with the cell class of the potential handover cell could be delivered to the user equipment. In the next step S12, the user equipment modifies its handover list based on the signal qualities of the destination cell and the current cell and the received handover parameter(s). The method then ends.

FIG. 13 is a flow diagram illustrating additional steps of the method of FIG. 12. The method continues from the step S11. In a next step S20, the user equipment compares signal qualities for the destination cell and the best serving cell using the received handover parameter(s). Based on this comparison, the user equipment transmits a list update request to the RNC in step S21. This request could state that the user equipment would like to add the destination cell to the active cell list, remove the cell therefrom or some other handover-related triggering procedure. The RNC then processes the request by e.g. investigating if there is a communication link available in the destination cell, contacting the base station of the destination cell, etc. The RNC generates a list update command and transmits it to the user equipment. Thus, in a next step S22, the user equipment receives the update command. The method then continues to the step S12 of FIG. 12, where the user equipment modifies or updates its associated handover list based on the received command.

Figure 14:
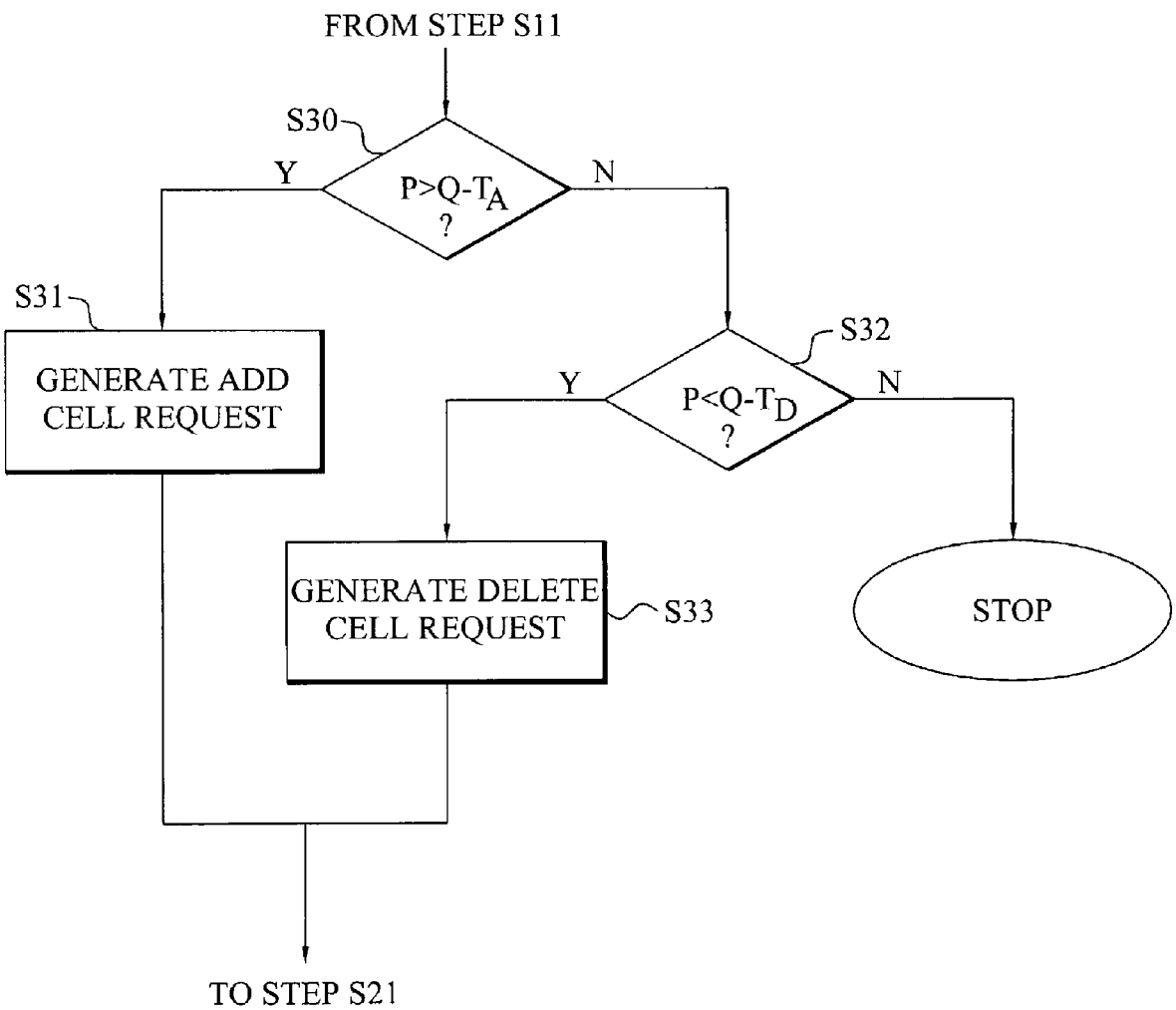
FIG. 14 is a flow diagram illustrating an example example of the comparing step of FIG. 13 in more detail.

FIG. 14 illustrates the comparison step S20 of FIG. 13 in more detail. The method continues from step S11 of FIG. 12. In a next step S30, the measured signal quality (P) of the destination cell is compared to the corresponding quality parameter (Q) of the current best serving cell using a handover parameter ($T_A$) associated with the cell class to which the destination cell currently belongs. If $P>Q-T_A$, an add cell request is then generated in step S31. This request preferably comprises an identification of the destination cell. The request is then transmitted to the RNC in the next step S21 of FIG. 13. However, if $P<Q-T_A$ the method continues to step S32. In this step S32, another signal quality comparison is performed, preferably using another handover parameter ($T_D$) of the same cell class as the parameter $T_A$. If $P<Q-T_D$, the measured signal quality of the link from the cell is too low and the cell should be deleted from the active cell list. A delete cell request preferably including the cell identifier of this cell is then generated in step S33 and subsequently transmitted to the RNC in the step S21 of FIG. 13. If $Q-T_D \leq P \leq Q-T_A$, $T_D > T_A$, the method ends.

The signal quality data used in the comparison of FIG. 14 could be the measured and preferably filtered signal quality data, e.g. RSCP, Ec/No, for the communications links of the two cells. In an alternative embodiment, the comparison data is calculated based on the measured raw-data possibly using other input data such as transmitted signal power of the links, on which the user equipment performs the signal quality measurements. Such additional data can then be received from the base station of the respective cells. A typical example of such a signal quality parameter is path loss that basically is determinable based on the transmitted (pilot) signal power and measured signal power (RSCP).

Figure 15:
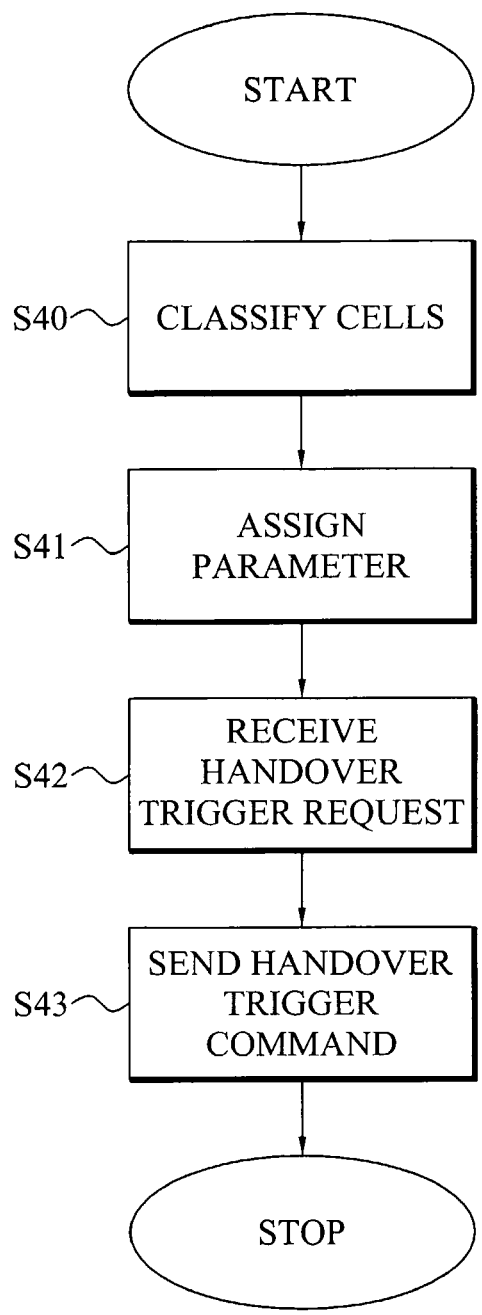
FIG. 15 is a flow diagram of another example method of triggering a handover-related procedure according to an aspect of the present invention.

FIG. 15 is a flow diagram illustrating an example method of triggering a handover-related procedure for the user equipment. In a first step S40, the cells of the communications system are classified into multiple handover-related classes. This step basically corresponds to the step S1 of FIG. 11 and is not further discussed. In a next step S41, the handover parameters are assigned to the determined cell classes. In this step S41, one or several unique parameters are assigned for each class in such a manner that classes where the radio coverage characteristics of their associated cells changes rapidly preferably have access to larger parameters compared to classes with slowly distance-dependently changing radio coverage. In a next step S42, the control unit or RNC receives a handover triggering request from the user equipment. Such a request is generated based on a comparison between signal quality measurements and handover parameters and preferably includes an identifier of the actual cell. The RNC then investigates whether it is possible to execute the requested handover procedure stated in the request by e.g. determining if there is an available communications link for the user equipment in the cell. If the requested handover procedure can be conducted, a handover triggering command is generated and transmitted to the user equipment in step S43. This triggering command allows the user equipment to perform the requested handover procedure, e.g. by updating its associated active cell list. The method then ends.

Figure 16:
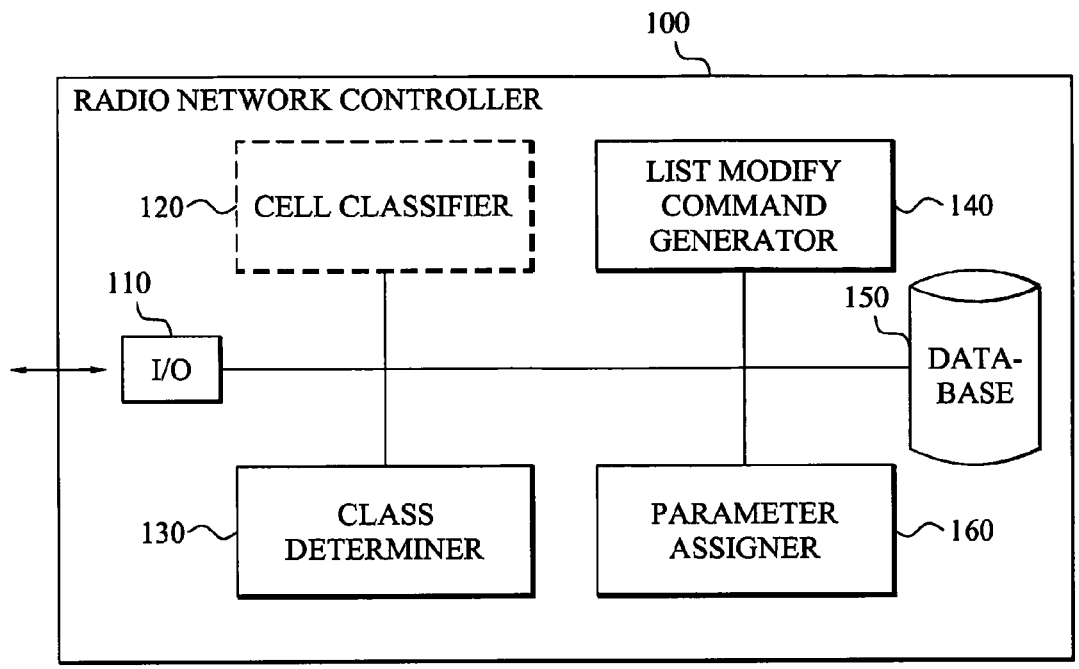
FIG. 16 is a schematic block diagram of a radio network controller according to an embodiment of the present invention.

FIG. 16 is a schematic block diagram of an example control unit 100 that manages handover procedures in a cellular communications system. In the figure, the control unit is represented by a RNC 100.

The RNC 100 comprises an input and output (I/O) unit 110 for conducting communication with external units, such as connected base stations. This I/O unit 110 is particularly configured for receiving handover request messages originating from user equipment in the system and for transmitting measurement control messages and list update messages thereto.

A cell classifier 120 could be provided in the RNC 100 for performing the division of cells into different handover-related classes bases on the radio coverage characteristics of the cells. The radio coverage data used for such classification could be obtained from a measurement or estimation unit (not illustrated) provided in the RNC 100 or in some other network node of the system. The classifier 120 could employ different classification of cells for different portions of the system or a single classification for all of the cells in the system. Typical examples of cell classes are cells of the same site versus cells of other sites, neighboring cells of the same site versus non-neighboring cells of the same site and cells of other sites, high-sectored cells versus low- and non-sectored cells, micro/pico cells versus macro cells, or some other classification discussed in the foregoing. The classifier 120 could be configured for performing this classification during the cell planning phase for the system and may then subsequently update the classification based on new radio coverage data for the cell, new traffic situations, etc. This cell classifier 120 could be arranged in the RNC 120 or elsewhere in the system, e.g. in connection with a cell planning tool. In either case, information of the selected cell classification is preferably stored in a database 150 provided in or otherwise associated with the RNC 100.

The RNC 100 can also have access to a parameter assigner 160 that assigns one or multiple handover-related parameters or thresholds for the cell classes defined by the cell classifier 120. These parameters are then stored in the database 150. The actual values of the different parameters can be determined based on data measured or estimated from some other unit in the RNC 100 or an external unit.

A class determiner 130 is provided in the RNC 100 for determining a current class affiliation of a cell. The class affiliation could be determined based on information of neighboring cells, which is preferably stored in the database 150 and on information of the cell(s) to which a mobile user equipment presently is connected. Alternatively, the RNC 100 could receive a handover parameter request from the user equipment. Such a request typically comprises the identifier of the requested cell and preferably the identifier of the current best serving cell for the user equipment. As was discussed in the foregoing, a given cell can belong to different classes depending on the current position of the requesting user equipment and the used classification. Once the correct cell class is identified, the class determiner 130 or some other unit in the RNC 100 fetches the requested handover parameters associated with the identified class from the database 150. The parameter(s) is (are) then transmitted using the I/O unit 110 to the user equipment.

The RNC 100 could also comprise a unit 140 for generating a handover triggering command or active cell list modifying command. This unit 140 preferably receives a request message from the user equipment, which notifies the unit 140 that a handover triggering event is present for the user equipment and that a handover procedure should be triggered. The unit 140 then investigates, preferably based on input data from other units, e.g. the base station of the relevant cell, whether such a handover procedure is feasible. If it is concluded that the requested handover procedure can be conducted, the unit 140 generates a handover triggering command that is transmitted to the user equipment where it is used for updating the active cell list of the user equipment, i.e. adding a new cell, removing an old cell, replacing cells, etc.

The units 110 to 140 and 160 of the RNC 100 may be implemented as software, hardware or a combination thereof. The units 110 to 160 may all be implemented in the RNC 100 in a single network node in the communications system. However, a distributed implementation is also possible, with the units 110 to 160 provided in different network nodes.

Figure 17:
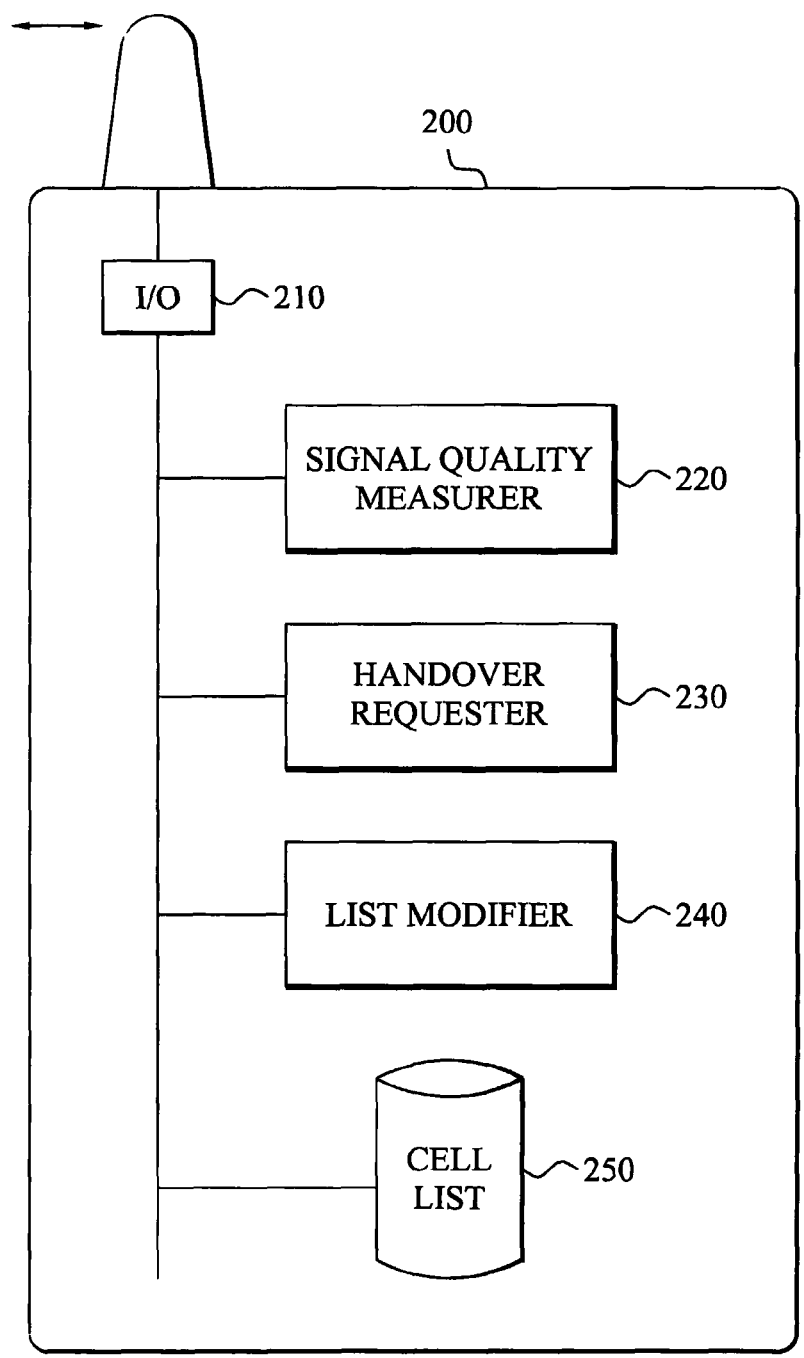
FIG. 17 is a schematic block diagram of a user equipment according to an embodiment of the present invention.

FIG. 17 is a schematic block diagram of an example mobile user equipment 200. The user equipment 200 comprises an I/O unit 210 for conducting communication with external units, including base stations in the cellular communications system. A signal quality measurer 220 is provided in the unit 200 for determining or estimating signal quality data for communications links, e.g. PCCH, BCCH, from base stations. Typical such quality data includes, but is not limited to, RSCP, Ec/No and path loss. The measurer 220 could be configured for continuously, intermittently or upon an event, e.g. reception of a measurement control message from the RNC, measure the signal quality on a pre-selected amount of communications links. The user equipment 200 preferably receives information of scrambling code, carrier information, cell identifiers or other data needed for performing the measurements from the RNC, the base stations or some other network node unit.

A handover requester 230 is preferably implemented in the user equipment 200 for generating a handover triggering request for a cell. Such a request message is transmitted to the RNC and preferably comprises information of the identifier of the cell. The generation of such request message is based on measured signal qualities, from the unit 220, on communications links to the cell and also preferably to a best serving cell present in the active cell list 250. The generation also uses the handover parameter(s) associated with the cell class to which the particular cell belongs. Such parameter data is preferably received by the I/O unit 210 together with the monitored cell list received from the RNC.

A list modifier 240 is configured for modifying and updating the cell lists stored in a memory or database 250 in the unit. These lists include the monitored list from the RNC, i.e. the list of the cell on which the measurer 220 should perform signal quality measurements, and the active list, i.e. those cells to which the user equipment 200 currently is connected. The modifier 240 updates the lists in the database 250 upon reception of a new list from the RNC or upon reception of a list update command therefrom.

The units 210 to 240 of the user equipment 200 may be implemented as software, hardware or a combination thereof.

Figure 18:
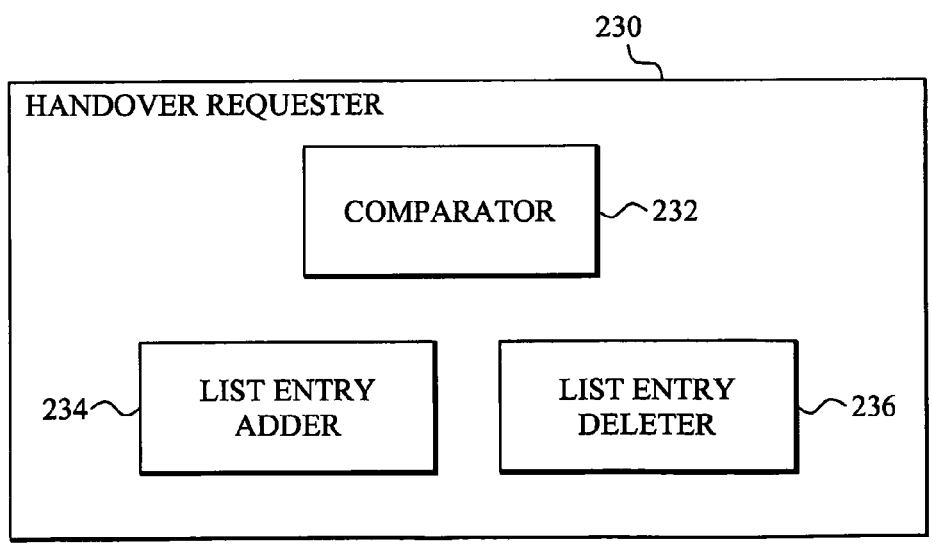
FIG. 18 is a schematic block diagram of an example handover requester of the user equipment of FIG. 17.

FIG. 18 is a block diagram illustrating an example of an implementation of the handover requesting unit 230. A comparator 232 is provided in the requester 230 for comparing signal quality measurements using handover parameters. Based on this comparison, the comparator 232 could generate a cell adding command or a cell removing command. A cell adding command is then forwarded to a list entry adder 234 that generates a cell add request message that is transmitted to the RNC. This message includes the identifier of the relevant cell and urges the RNC to initiate a handover procedure that results in that the cell is added to the active list and the user equipment is connected to the cell. A cell removing command causes a list entry deleter 236 to generate a cell delete command that, once received by the RNC, request the RNC to remove the cell from the active list of the user equipment. In addition, the connection to the base station of this cell should be withdrawn.

The units 232 to 236 of the requesting unit 230 may be implemented as software, hardware or a requesting unit 230. However, a distributed implementation is also possible, with the units 232 to 236 provided elsewhere in the user equipment.

The user equipment is preferably able to support different measurement reporting criteria as defined in the 3GG document [6]. Different measurement identities can then be set up in the user equipment for cells of different handover-related classes. According to the document [6], the user equipment should support up to eight events for all measurement identities for intra-frequency measurements. Moreover, the total number of events for intra-frequency, inter-frequency and inter-RAT (Radio Access Technology) measurements together is limited by 18. In such a case, is possible to utilize separate measurement control messages with different measurement identities for different cell classes. However, the present invention can also be applied to user equipment that can only handle one measurement identity since the RNC can then assign measurement control parameters based on the cell classification.

It will be understood by a person skilled in the art that various modifications and changes may be made to the present invention without departure from the scope thereof, which is defined by the appended claims.

REFERENCES

[1] 3GPP TS 25.331 V6.0.0; $3^{rd}$ Generation Partnership Project; Technical Specification Group Radio Access Network; Radio Resource Control (RRC); protocol specification; December 2003
[2] U.S. Pat. No. 6,584,318
[3] U.S. Pat. No. 6,044,249
[4] International Patent Application No. 02/47423
[5] 3GPP TS 25.922 V5.2.0; $3^{rd}$ Generation Partnership Project; Technical Specification Group Radio Access Network; Radio resource management strategies; December 2003
[6] 3GPP TS 25.133 V6.4.0; $3^{rd}$ Generation Partnership Project; Technical Specification Group Radio Access Network; Requirements for support of radio resource management; December 2003

The invention claimed is:

1. A method of a control node of a wireless communication system for controlling a handover of a user equipment from a first cell to a second cell, the first cell being a serving cell of the user equipment and the second cell being a destination cell, the method comprising:
    gathering handover data comprising history data and estimations of previous handovers in the wireless communication system;
    analyzing the gathered handover data to determine radio coverage characteristics of the second cell; and
    adjusting the handover parameters to provide a handover region for the handover of the user equipment from the first cell to the second cell based a rate of change in the radio coverage characteristics per distance between the first and second cells.

2. The method of claim 1, wherein the handover data includes one or both of the changes in the radio coverage characteristics and handover history.

3. The method of claim 1, wherein the handover parameters include parameters in a handover triggering criterion indicating that the second cell will be a better candidate to be the serving cell than the first cell.

4. The method of claim 1, wherein the handover parameters are adjusted so as to provide the user equipment with a handover region sufficient to complete the handover in light of the change in the radio coverage characteristics as the user equipment moves from the first cell to the second cell.

5. A method of a control node of a wireless communication system for controlling a handover of a user equipment from a serving cell to one or more destination cells, the method comprising:
    classifying each destination cell into one of a plurality of handover-related classes based on radio coverage characteristics of that destination cell, each handover-related class being associated with a handover signal quality threshold; and assigning, for each destination cell, the handover signal quality threshold associated with the handover-related class to which that destination cell is classified, wherein the handover signal quality threshold for at least two handover-related classes are different from each other, wherein the handover-related class of each destination cell is classified based on a rate of change of the radio coverage characteristic per distance between the serving cell and that destination cell, and wherein the handover signal quality threshold for each handover-related class is set such that a handover region corresponding to the handover signal quality threshold is sufficient allow the user equipment to complete a handover procedure from the serving cell to that destination cell.

6. The method of claim 5, wherein the handover region corresponding to at least one handover related class is substantially a minimum handover region sufficient to complete the handover procedure from the serving cell to that destination cell.

7. The method of claim 5, wherein the handover signal quality threshold of the handover-related class that includes destination cells with higher rates of change is greater than the handover signal quality threshold of the handover-related class that includes destination cells with lower rates of change.

8. The method of claim 7, wherein the destination cells include first and second destination cells are respectively classified into first and second handover-related classes, wherein first and second handover signal quality thresholds respectively associated with the first and second handover-related classes, the first and second handover signal quality thresholds being different from each other, and first and second handover signal quality thresholds are such that a first handover region corresponding to the first handover signal quality threshold is substantially equal to a second handover region corresponding to the second handover signal quality threshold.

9. The method of claim 5, wherein one or more destination cells of a same site as the serving cell are in a first handover-related class, and one or more destination cells of a different site from the serving cell are in a second handover-related class, and wherein the handover signal quality threshold of the first handover-related class greater than the handover signal quality threshold of the first handover-related class.

10. The method of claim 5, further comprising:

generating a handover triggering command based on measured signal quality of a communications link between the user equipment and a destination cell and on an assigned handover signal quality threshold associated with the handover-related class of the destination cell; and transmitting the handover triggering command to the user equipment, the handover triggering command allowing the user equipment to perform the handover-related procedure involving the destination cell.

11. A method for modifying a list of connected cells for a user equipment connected to a serving cell in a wireless communications system, comprising:

measuring a signal quality for a communications link between the user equipment and a destination cell;

receiving a handover signal quality threshold for the destination cell, the handover signal quality threshold being determined based on a radio coverage characteristics of the destination cell; and modifying the list based on the measured signal quality, the received handover signal quality threshold, and a rate of change of the radio coverage characteristics per distance between the serving cell and the destination cell, wherein the handover signal quality threshold for the destination cell is such that a handover region corresponding to the handover signal quality threshold is sufficient allow the user equipment to complete a handover procedure from the serving cell to the destination cell.

12. The method according to claim 11, further comprising:

measuring a signal quality for a communications link between the user equipment and the serving cell; and generating a list update request based on a comparison between the measured signal quality of the serving cell, the measured signal quality of the destination cell, and the handover signal quality threshold.

13. A control node of a wireless communication system structured to controlling a handover of a user equipment from a serving cell to one or more destination cells, the control node comprising:

a cell classifier structured to classify each destination cell into one of a plurality of handover-related classes based on radio coverage characteristics of that destination cell, each handover-related class being associated with a handover signal quality threshold; and a parameter assigner structured to assign, for each destination cell, the handover signal quality threshold associated with the handover-related class to which that destination cell is classified, wherein the handover signal quality threshold for at least two handover-related classes are different from each other, wherein the cell classifier is structured to classify the handover-related class of each destination cell based on a rate of change of the radio coverage characteristics per distance between the serving cell and that destination cell, and wherein the handover signal quality threshold for each handover-related class is set such that a handover region corresponding to the handover signal quality threshold is sufficient allow the user equipment to complete a handover procedure from the serving cell to that destination cell.

14. The control node of claim 13, wherein the handover signal quality threshold of the handover-related class that includes destination cells with higher rates of change is greater than the handover signal quality threshold of the handover-related class that includes destination cells with lower rates of change.

15. The control node of claim 14, wherein the destination cells include first and second destination cells are respectively classified into first and second handover-related classes, wherein first and second handover signal quality thresholds respectively associated with the first and second handover-related classes, the first and second handover signal quality thresholds being different from each other, and first and second handover signal quality thresholds are such that a first handover region corresponding to the first handover signal quality threshold is substantially equal to a second handover region corresponding to the second handover signal quality threshold.

16. The control node of claim 13, further comprising:
a command generator structured to generate a handover triggering command based on measured signal quality of a communications link between the user equipment and a destination cell and on an assigned handover signal quality threshold associated with the handover-related class of the destination cell, and to transmit the handover triggering command to the user equipment, the handover triggering command allowing the user equipment to perform the handover-related procedure involving the destination cell.

17. A user equipment connected to a serving cell of a wireless communications system, the user equipment, the user equipment comprising:
a signal quality measurer structured to measure a signal quality for a communications link between the user equipment and a destination cell;
a handover requester structured to receive a handover signal quality threshold for the destination cell, the handover signal quality threshold being determined based on a radio coverage characteristics of the destination cell; and
a list modifier structured to modify the list based on the measured signal quality, the received handover signal quality threshold, and a rate of change of the radio coverage characteristics per distance between the serving cell and the destination cell,
wherein the handover signal quality threshold for the destination cell is such that a handover region corresponding to the handover signal quality threshold is sufficient allow the user equipment to complete a handover procedure from the serving cell to the destination cell.

18. The method of claim 1, wherein the handover parameters are adjusted further based on a traveling speed of the user equipment.

19. The method of claim 1, wherein the handover parameters are adjusted further based radio resource utilization efficiency.

20. The method of claim 1, wherein the handover parameters are adjusted so as to avoid ping-pong effect.

21. A method of a control node of a wireless communication system for controlling a handover of a user equipment from a source cell to a destination cell, the method comprising:
gathering handover data comprising history data and estimations of previous handovers in the wireless communication system, the gathered handover data including data related to radio propagation conditions in the source cell and the destination cell; and
determining a handover parameter based on a change of the radio propagation conditions per traveled distance from the source cell to the destination cell, the handover parameter defining a handover region to enable the handover of the user equipment from the source cell to the destination cell, the handover region being a geographical region comprising a portion of the source cell and a portion of the destination cell.

22. The method of claim 21,
wherein Q is a parameter representing a quality of a signal from the source cell as measured by the user equipment,
wherein P is a parameter representing a quality of a signal from the destination cell as measured by the user equipment,
wherein the step of determining the handover parameter comprises setting a handover threshold T, where when P>Q−T as the user equipment moves, the handover of the user equipment from the source cell to the destination cell is triggered.

23. The method of claim 21,
wherein the destination cell is a first destination cell, the handover parameter is a first handover parameter, and the handover region is a first handover region,
wherein the gathered handover data also includes data related to radio propagation conditions in a second destination cell,
wherein the method further comprises determining a second handover parameter based on a change of the radio propagation conditions per traveled distance from the source cell and the second destination cell, the second handover parameter defining a second handover region to enable a handover of the user equipment from the source cell to the second destination cell, the second handover region being a geographical region comprising a second portion the source cell and a portion of the second destination cell, and
wherein the first and second handover regions are geographically a same order of size.

24. The method of claim 21, wherein the handover region is sufficient to enable the user equipment to measure, report, configure and synchronize to the destination cell as the user equipment moves before a link to the source cell has to be dropped due to insufficient link quality between the source cell and the user equipment.

25. The method of claim 21, further comprising determining the handover parameter also based a traveling speed of the user equipment.

* * * * *

UNITED STATES PATENT AND TRADEMARK OFFICE
CERTIFICATE OF CORRECTION

PATENT NO. : 8,639,251 B2
APPLICATION NO. : 10/594122
DATED : January 28, 2014
INVENTOR(S) : Gunnarsson et al.

It is certified that error appears in the above-identified patent and that said Letters Patent is hereby corrected as shown below:

In the Specification

In Column 3, Line 10, delete "as of" and insert -- aspects of --, therefor.

In Column 3, Line 46, delete "bee" and insert -- be --, therefor.

In Column 4, Line 50, delete "least" and insert -- at least --, therefor.

In Column 4, Lines 56-58, delete "[0025] Reduces unnecessary occupation of communications resources caused by too large handover regions." and insert -- Reduces unnecessary occupation of communications resources caused by too large handover regions. --, therefor at Line 57 as a new sub point.

In Column 5, Line 39, delete "an example example" and insert -- an example --, therefor.

In Column 8, Line 59, delete "emboli" and insert -- embodiments, --, therefor.

In Column 9, Line 10, delete "Statio" and insert -- Station --, therefor.

In Column 10, Lines 14-15, delete "embodiment present" and insert -- embodiment(s) of the present --, therefor.

In Column 11, Line 47, delete "Frequency Division Multiple Access (FMDA)" and insert -- Frequency Division Multiple Access (FDMA) --, therefor.

In Column 16, Line 13, delete "RNC 120" and insert -- RNC 100 --, therefor.

In Columns 16 & 17, Lines 67 & 1, delete "unit 200" and insert -- user equipment 200 --, therefor.

Signed and Sealed this
Twelfth Day of August, 2014

Michelle K. Lee
*Deputy Director of the United States Patent and Trademark Office*

CERTIFICATE OF CORRECTION (continued)
U.S. Pat. No. 8,639,251 B2

In Column 17, Line 67, delete "case, is" and insert -- case, it is --, therefor.

In the Claims

In Column 19, Line 9, in Claim 5, delete "characteristic" and insert -- characteristics --, therefor.